Figure 1:
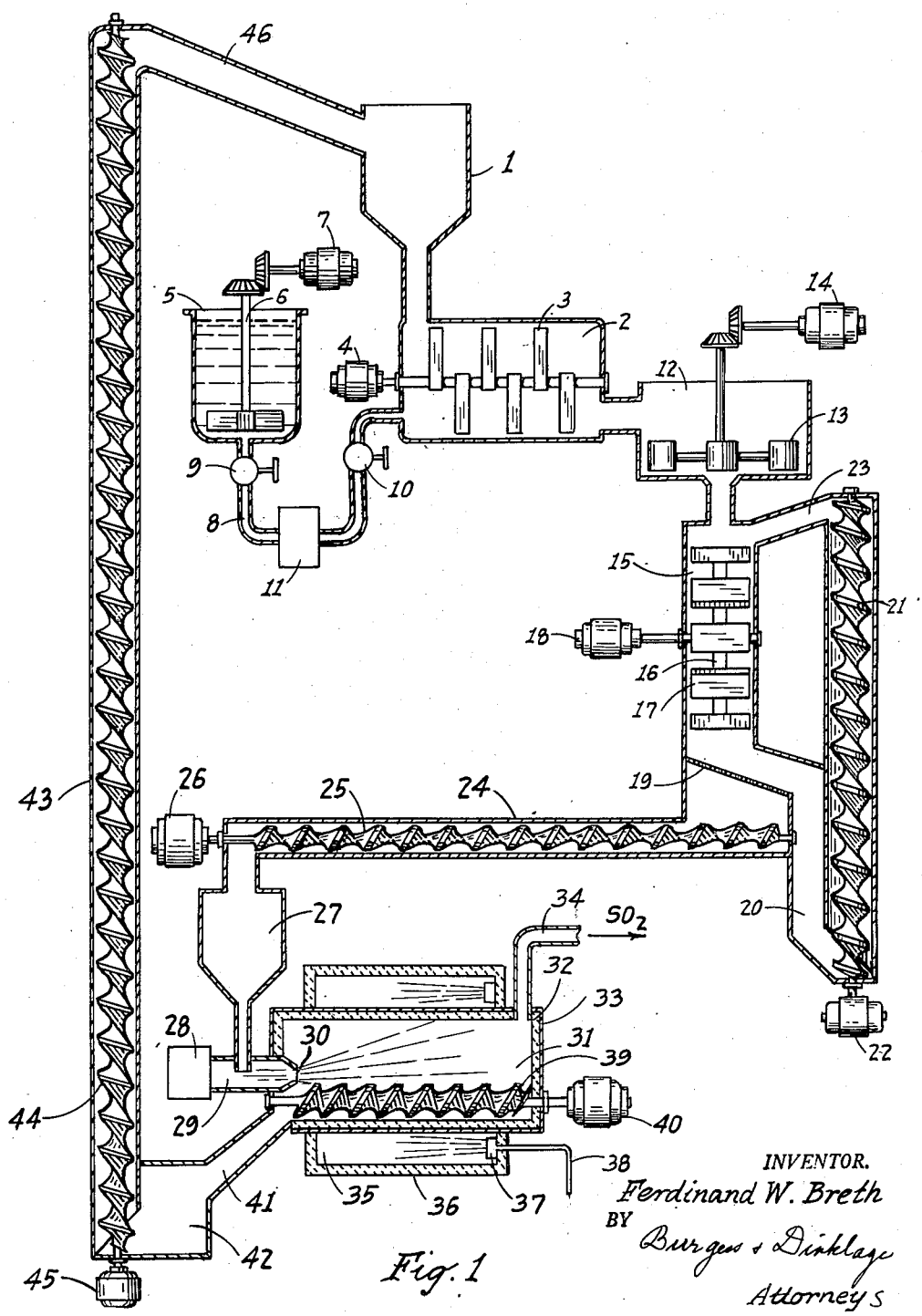

Patented Oct. 16, 1951

2,571,107

UNITED STATES PATENT OFFICE 2,571,107

RECOVERY OF ACID VALUES FROM SULFURIC ACID SLUDGES

Ferdinand W. Breth, Petrolia, Pa., assignor to L. Sonneborn Sons, Inc., a corporation of Delaware Application May 7, 1947, Serial No. 746,523

2 Claims. (Cl. 23—177)

This invention relates to new and useful improvements in the recovery of acid values from sulfuric acid sludges.

Conventional refining of many organic materials includes treatment with sulfuric acid either as such or in the form of fuming sulfuric acid or $SO_3$. Such treatment results in the formation of acid sludges which are essentially composed of sulfuric acid, sulfonates and hydrocarbon material.

Various methods have been proposed in the past for the recovery of acid values from these sludges and particularly in connection with such sludges derived from the conventional sulfuric acid refining of hydrocarbons and notably petroleum hydrocarbons. One of these methods involves the thermal decomposition of the acid sludge in a rotary kiln. In this method, however, relatively large solid blistered masses of thermal decomposition products are formed. These tend to interfere with the complete decomposition of the sludge and to clog these kilns. For this reason tumblers are used which are commonly in the form of steel bars or rails and which tumble back and forth and up and down, induced by the rotation of the kiln, thereby inducing the continuous breaking up of these solid masses of decomposition products. This practice has the economical disadvantage that it entails the relatively rapid wearing out of kiln linings and necessitates, due to the corrosive action of the sludge, frequent renewal of the tumblers. Furthermore, the average yields of total reclaimable acid values obtained in the practice of this method are not always satisfactory.

An alternative method for the recovery of acid values from sludges proposes to coat a finely subdivided coke material with the acid sludge so as to distribute the latter over a relatively large surface, using the coke as a carrier. The mass is then mechanically transported to and through a closed heating zone by means of a worm conveyor. Though somewhat better yields in reclaimable acid values are obtained in the practice of this method, the same is still relatively time consuming and subject to the disadvantage of the formation of solid reaction masses that require breaking up and involve the danger of clogging of the machinery, which is particularly detrimental to continuous operations.

One object of the instant invention comprises, inter alia, an improved method for the reclaiming of acid values from sulfuric acid sludges and particularly a method permitting thermal flash decomposition of such sludges while at the same time substantially avoiding formation of relatively solidly massed decomposition products.

Figure 2:
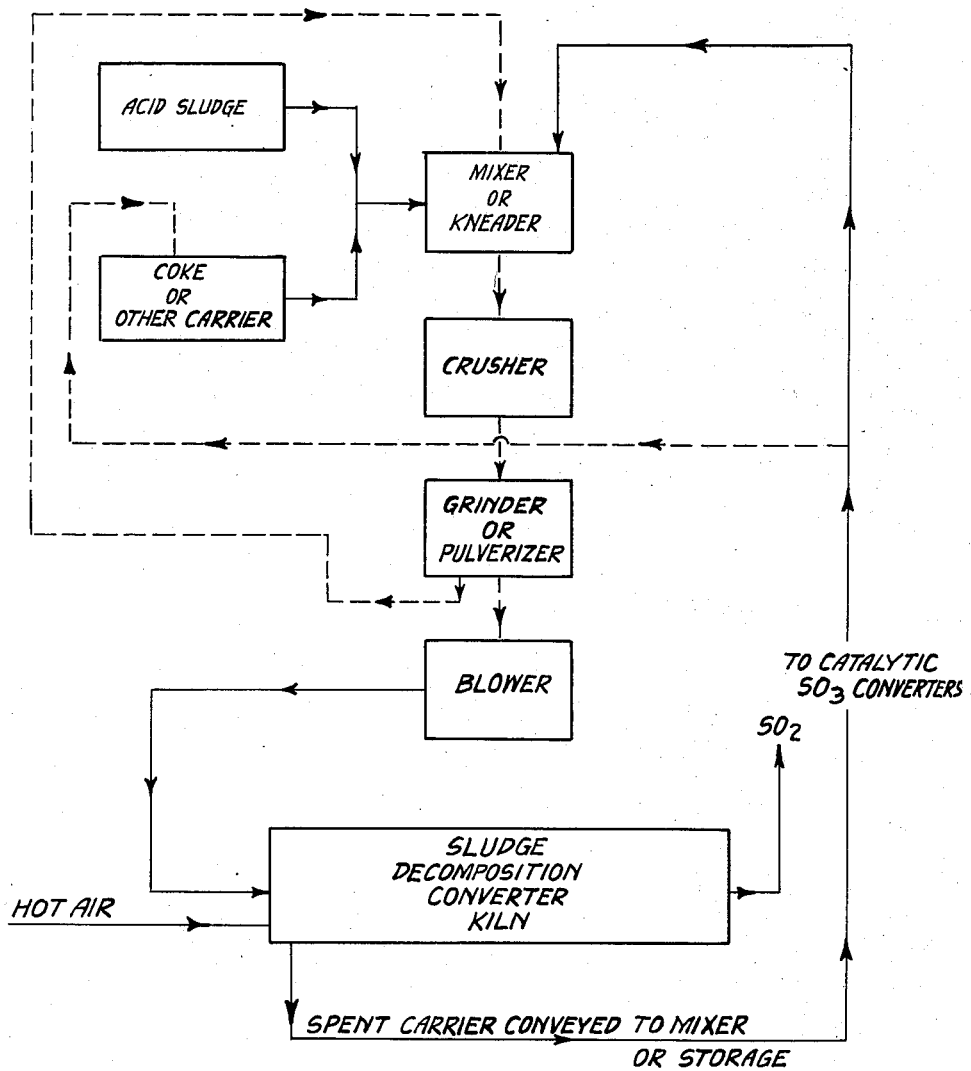

This and further objects of the invention will be apparent from the following description read in conjunction with the drawings in which:

Fig. 1 is a diagrammatic showing of means illustrating a preferred form of carrying out the method in accordance with the invention; and Fig. 2 is a representation of a flow-sheet diagrammatically illustrating the practice of the invention.

The method in accordance with the invention essentially comprises intimately contacting a sulfuric acid sludge with a particled carrier in amount sufficient to obtain a substantially friable product, thereafter subdividing said friable product into blowable form, conveying said blowable material in a stream of an oxidizing gas through a thermal decomposition zone for said sludge to thereby substantially flash decompose the same, and recovering sulfur dioxide from said zone.

The sulfuric acid sludge that may be used in accordance with the invention may be any suitable acid sludge derived in the conventional sulfuric acid, fuming sulfuric acid or $SO_3$ treatment of organic materials. Suitable acid sludges of this type are, for instance, those commonly designated as alcohol spent acid, alkylation sludge acid, petroleum refining acid sludge, naphtha sludge, etc. Within the preferred practice of the invention, however, the novel method is applied to an acid sludge conventionally derived from the fuming sulfuric acid treatment of petroleum oil distillates.

The particled carrier that may be used in the practice of this invention may be any carrier material suitably subdivided to form discrete particles and substantially inert to the action of the sludge. The same is preferably of an adsorbent nature, and may include such materials as diatomaceous earth, kieselguhr, silica, crushed coal, by-product furnace coke, or other carbonaceous material and in general any filter material conventionally used in the adsorbent refining of petroleum oil distillates provided the same is substantially inert to reaction with the sludge acid. Within the preferred scope of my invention, however, advantageous use is made of a carbonaceous carrier such as the coked material obtained in the thermal decomposition of a sulfuric acid sludge. The procedure in accordance with the invention then lends itself advantageously to continuous operations, permitting the continuing use or re-use of at least part of the separated carbonaceous matter for admixture with a continuously inflowing stream of acid sludge to yield the desired friable product.

Effective particle size of the carrier material largely depends, inter alia, upon the type of material used. For a carbonaceous material, such as an acid sludge residual coke, it is recommended that the same comprise discrete particles predominantly of a size of an order of magnitude substantially not exceeding 4 mesh. On the other hand, for other carrier materials, such as silica or diatomaceous earth, etc., it is of advantage if these comprise discrete particles predominantly not exceeding a mesh size in the order of magnitude of substantially 12 mesh. Generally for all around good results, it is preferred that the particled carrier predominate in particles of a size within the order of magnitude of 12 to 16 mesh. The subdivision of the carrier into discrete particles may be obtained in any desired conventional manner, such as by grinding, impacting or the like.

The proportions of sludge and particles of carrier material to be used in accordance with the invention to obtain a substantially friable product may vary, dependent, inter alia, upon the type, origin or consistency of the sludge, as well as upon the type and specific predominant particle size or range of particle size of the carrier. At least about 2-5 parts by weight of the carrier for each part by weight of the acid sludge usually suffices to obtain a satisfactorily friable product. In some cases the proportions of carrier to sludge may be as high as 10-20:1.

The friably intermediate product in accordance with the invention may be reduced, within the novel procedure herein set forth, to blowable form by any suitable attritive means. The friable product as it results from the acid sludge-carrier mixture is a substantially solid, relatively dry, coherent mass and lends itself to ordinary grinding as for instance in a conventional impact mill. When using the expression "blowable" or such similar term in designation of the subdivided product which is to be conveyed through the decomposition zone, it is intended to define thereby a product of such particle size as will permit conveyance by an air stream through the decomposition zone. The fineness of required subdivision of a blowable product depends, inter alia, upon the specific gravity of the product and the velocity of the air or other oxidizing gas current in or by which it is to be conveyed. Generally, a sludge-carrier composite reduced to a fineness of subdivision characterizable as "pulverized," within the conventional connotation of this term in the art, constitutes a satisfactorily blowable product within the preferred practice of the invention. A preferred pulverized sludge-carrier composite, and particularly when using as the carrier a carbonaceous material such as a sludge residual coke, is one predominantly comprising particles of a mesh size of the order of magnitude not exceeding 50 and preferably not exceeding 100 mesh.

The oxidizing gas useful for conveying the pulverized product through the thermal decomposition zone may be any suitable gas having oxidizing properties and is preferably an air stream. The pulverized material may be suitably passed into an oxidizing gas current continuously flowing through or into the decomposition zone; alternatively a suitable conventional blower arrangement may be used to blow the oxidizing gas current together with the pulverized material through or into the decomposition zone.

The temperature in the decomposition zone is ordinarily kept in excess of the one at which decomposition of the particular sludge is effected, which in the majority of cases is above 320° F. It is one of the advantageous results obtained when proceeding in accordance with the invention, that the temperature need not be materially raised above that at which ordinary decomposition of the sludge material first appears, and for this reason generally a temperature range between 320 and 600° F. is satisfactory for most purposes.

Heating is effected by indirect heating means such as by heating the walls of the decomposition chamber, passing heating flues through such chamber, preheating the gas current, passing hot combustion gasses through the chamber or by any other suitable conventional method. The thermal decomposition zone may be any suitable enclosure such as a kiln and heating may be effected by externally firing the kiln to supply radiant heat to the decomposition zone. Alternatively, when feeding the finely divided blowable material into an oxidizing gas current flowing through the decomposition zone, the gas may be preheated to the desired temperature. The decomposition of sludge material is a flash decomposition, i. e., it takes place practically instantaneously when the carrier-sludge particles hit the thermal decomposition zone. When using, within the preferred embodiment of the invention, coke or other carbonaceous material as the sludge carrier, sufficient caloric values may be liberated by the oxidation of (among others) carbonaceous material to permit discontinuance of external application of heat once effective decomposition is initiated. In such event the decomposition temperature will continue to be maintained through continuing oxidation.

In the decomposition chamber the decomposition reaction produces gaseous materials comprising predominantly $SO_2$ together with such by-product gases as $CO_2$, $N_2$, $O_2$ and $H_2O$. Solid, finely divided matter predominantly comprising carrier and/or carbonaceous material is preferably continuously withdrawn from the decomposition zone and can be used for various purposes, including, within the preferred embodiment of the invention, for recycling into the process, thus making it available as carrier material for continuously added fresh sludge material. The gaseous, acid value containing materials are passed out of the decomposition zone. They may be suitably freed from their impurities, such as by condensation, $CO_2$ stripping procedure or other conventional means, making the reclaimed $SO_2$ available for suitable use, including reconversion into sulfuric acid in conventional catalytic contact towers.

The following specific examples are furnished by way of illustration and not of limitation:

Example I 1000 parts by weight of a by-product acid sludge coke were mixed with 500 parts by weight of a highly viscous acid sludge obtained by the conventional fuming sulfuric acid treatment of a 750 viscosity (seconds Saybolt at 100° F.) gulf coast distillate. The composition of the sludge was as follows: free sulfuric acid 48.4%, petroleum sulfonic acid 8.0%, water 6.5%, hydrocarbons 37.1%.

The resultant mixture of sludge and coke was crushed and then fed into an impact mill where it was pulverized to a particle size predominantly averaging 100 mesh. The pulverized material was delivered through a screen retaining particles coarser than 100 mesh, which were returned to the impact chamber for further pulverization. The yield of pulverized mixture smaller than 100 mesh was 65% of the total weight of the initial charge of sludge and coke. This material was then delivered by an air blast to an externally fired kiln, the interior of which was held and controlled thermostatically at a temperature of about 400° F. The gases emerging from the kiln analyzed as follows: $SO_2$ 94.0%, $CO_2$, $N_2$, CO, $H_2O$, $O_2$ and other non-sulfur containing gases 6.0%. The carbonaceous matter formed upon the decomposition of the sludge coke mixture analyzed substantially 98% pure carbon suitable for recycling to the mixing stage with additional sludge.

Example II

The treatment specified in Example I was repeated except that instead of the carbonaceous material there used, diatomaceous earth was employed as a carrier material and mixed with the sludge. The predominant particle size of the diatomaceous earth corresponded to about the same mesh as that specified for the carbonaceous material used in Example I. The steps and conditions of treatment and the sludge material were the same as designated in connection with the previous example. The pulverized product blown into the decomposition zone yielded a gas take-off substantially corresponding to the same analysis as that obtained in connection with Example I. The precipitated carrier material comprised the diatomaceous earth together with carbonaceous matter resulting from the decomposition of the sludge. This was then used for recycling.

In lieu of the diatomaceous earth specified in Example II, any other carrier substantially inert to the action of the sludge and of the type conventionally used in the adsorption refining of petroleum oil distillates, such as silica and substituted for the diatomaceous earth in Example II gives similar results.

Example III 1000 parts by weight of a by-product acid sludge coke of a predominant particle size of at least 100 mesh were mixed with 100 parts by weight of a relatively free-flowing acid sludge obtained by the conventional fuming sulfuric acid treatment of a Pennsylvania kerosene distillate. The composition of the sludge was as follows: free sulfuric acid 49.4%, petroleum sulfonic acid 9.9%, water 3.2%, hydrocarbon 38.3%.

The mixture constituting a relatively compact friable mass, which was then crushed and pulverized and subjected to the decomposition in an oxidizing gas stream substantially in the manner and under the conditions specified in connection with the preceding examples. The analysis of the gas take-off was as follows: sulfur dioxide 92.5%, $CO_2$, $N_2$, $O_2$ and other gaseous impurities 7.5%.

The practical operation of a preferred embodiment of the invention by way of continuous operation will now be described having specific reference to the diagrammatic illustration of Figs. 1 and 2.

Bin 1 containing particled coke predominantly of a mesh size between about 12 and 16 mesh and derived from the thermal decomposition of acid sludge discharges the same into a mixer 2 provided with kneading or mixing paddles 3 driven by motor 4. Acid sludge, such as specified by way of illustration in the preceding examples is pumped through pump 11 from tank 5, provided with stirrer 6 driven by motor 7, through connection 8, provided with valves 9 and 10, into mixer or tank 2. The continuous inflow of sludge and coke or other carrier is so adjusted that the thoroughly mixed material passing out of the mixer constitutes a substantially friable composite. This composite then moves into crusher 12 provided with crusher spider 13 driven by motor 14. The crushed, relatively coarse material passes through crusher 12 into impact grinder 15 provided with the conventional impact wheel 16, carrying centrifugally operable impact hammers 17 and driven by motor 18. The ground material drops onto screen 19 and the fines, of a mesh size below about 75 mesh, pass through the screen while the coarser particles pass into bin 20 whence they are transported by the vertical elevator worm 21 driven by motor 22 to the chute 23 for recycling into the grinder 15. The fines of the composite, passing through screen 19, are conveyed by conveyor 24, including the worm element 25 and motor 26, to fall into the bin 27 whence the pulverized material feeds into an air stream produced by compressor 28 and passing through conduit 29 and nozzle 30 into kiln 31. The kiln carries a brick lining 32 inside metal shell 33 and is provided with a gas take-off 34. A firing compartment 35 outside the kiln, preferably of fireproof brick 36, is provided with a burner or annular burner ring 37 supplied with fuel through connection 38. The temperature within the kiln is thermostatically controlled to be maintained at about 400° F. As the composite powder hits the interior of the kiln it is practically instantaneously decomposed into gaseous and carbonaceous matter. At the bottom of kiln 31 a suitable conveyor, such as the worm conveyor 39 driven by motor 40, transports the solid decomposition residue material to the chute 41 whence it passes into bin 42. A vertical elevator 43 carrying conveyor worm 44 driven by motor 45 conveys at least part of the pulverized material from bin 42 back to the top chute 46 connected to and supplying bin 1.

Specifically referring to the flow-sheet representation shown in Fig. 2, acid sludge and finely divided coke or other carrier are passed into the mixer or kneader, thence to the crusher, thence to the grinder or pulverizer, thence to the blower and thence to the sludge decomposition converter kiln. The flow-sheet representation shows an embodiment alternative to that diagrammatically represented in Fig. 1 in that the kiln is supplied with a current of hot air preferably sufficient to maintain an $SO_2:O_2$ ratio required for subsequent production of $SO_3$ instead of being externally heated. In this case the pulverized material passes into the hot air stream in the kiln. Further following the flow-sheet representation, $SO_2$ or $SO_2$ and $O_2$ is taken off the kiln to be piped into catalytic $SO_3$ converters and spent coke is removed in part to storage and in part recycled to the mixer or kneader. Also by way of alternative embodiment, the diagrammatic illustration shows recycling of that part of the pulverized material which is too coarse to be satisfactorily blowable, back into the mixer instead of being recycled back into the grinder as shown in Fig. 1.

Thus, it will be seen from the foregoing that the invention within its broadest aspects comprises the conveying of finely divided particles of a composite containing sulfuric acid sludge and carrier material into a thermal decomposition zone under oxidizing conditions to thereby flash decompose the same, and recovering sulfur dioxide from said zone.

The foregoing specific description is for purposes of illustration and not of limitation and it is therefore my intention that the invention be limited only by the appended claims or their equivalents wherein I have endeavored to claim broadly all inherent novelty.

I claim:

1. In the method of recovering acid values from sulfuric acid sludges, the improvement which comprises blowing, in a current of air, finely divided particles of a friable product substantially composed of a particled carbonaceous carrier material containing adsorbed sulfuric acid sludge into a thermal decomposition zone to thereby substantially flash decompose the same, and recovering sulfur dioxide from said zone, said friable product containing about at least 2 parts by weight of said carrier material for each part by weight of the said acid sludge, and maintaining a decomposition temperature within said zone of an excess of 320° F., at least a portion of said carbonaceous carrier being combusted in said zone to substantially replenish at least a part of the endothermic heat loss therein, said friable product predominantly comprising particles in the order of magnitude not substantially exceeding 50 mesh.

2. In the method of recovering acid values from sulfuric acid sludges, the improvement which comprises intimately contacting a sulfuric acid sludge with a particled carbonaceous carrier predominantly of a mesh size in the order of magnitude not substantially exceeding 4 mesh and in amount sufficient to obtain a substantially friable product containing at least 2 parts by weight of said carbonaceous carrier for each part by weight of said acid sludge, substantially pulverizing said friable product into discrete particles of an order of magnitude not substantially exceeding 50 mesh, substantially blowing the pulverized material in a stream of air into a thermal decomposition zone for said sludge while substantially maintaining a decomposition temperature therein in excess of 320° F. to thereby substantially flash decompose said blowable material, maintaining a decomposition temperature within said zone of in excess of 320° F. by the decomposition of at least a portion of said carbonaceous carrier in at least partial replenishing of the endothermic heat loss within said zone, and recovering sulfur dioxide from said zone.

FERDINAND W. BRETH.

REFERENCES CITED

The following references are of record in the file of this patent:

UNITED STATES PATENTS

| Number | Name | Date |
|---|---|---|
| 2,066,562 | Fowler | Jan. 5, 1937 |
| 2,097,271 | Debuch et al. | Oct. 26, 1937 |
| 2,395,503 | Ross et al. | Feb. 26, 1946 |
| 2,412,667 | Arveson | Dec. 17, 1946 |
| 2,467,855 | Read | Apr. 19, 1949 |